US009730376B2

(12) United States Patent
Behra et al.

(10) Patent No.: US 9,730,376 B2
(45) Date of Patent: Aug. 15, 2017

(54) SELF-PROPELLED HARVESTING MACHINE

(71) Applicant: CLAAS SELBSTFAHRENDE ERNTEMASCHINEN GMBH, Harsewinkel (DE)

(72) Inventors: Jan Philipp Behra, Guetersloh (DE); Markus Loeneke, Bueren (DE); Stephan Bleischwitz, Borchen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 29 days.

(21) Appl. No.: 14/680,168

(22) Filed: Apr. 7, 2015

(65) Prior Publication Data
US 2015/0289437 A1 Oct. 15, 2015

(30) Foreign Application Priority Data
Apr. 11, 2014 (DE) .................. 10 2014 105 163

(51) Int. Cl.
*B62D 11/00* (2006.01)
*A01B 69/00* (2006.01)
*B62D 11/24* (2006.01)
*A01D 41/02* (2006.01)
*A01D 41/12* (2006.01)
*B62D 11/04* (2006.01)

(52) U.S. Cl.
CPC ............ *A01B 69/007* (2013.01); *A01D 41/02* (2013.01); *A01D 41/12* (2013.01); *B62D 11/04* (2013.01); *B62D 11/24* (2013.01)

(58) Field of Classification Search
CPC ...... A01B 69/007; A01D 41/02; A01D 41/12; B62D 11/04; B62D 11/24
See application file for complete search history.

(56) References Cited

U.S. PATENT DOCUMENTS 5,191,950 A 3/1993 Kleineisel et al.
5,191,952 A 3/1993 Satzler et al.
(Continued)

FOREIGN PATENT DOCUMENTS

DE 4016496 11/1991
DE 4193720 10/1993
(Continued)

*Primary Examiner* — Kevin Hurley
*Assistant Examiner* — Marlon A Arce
(74) *Attorney, Agent, or Firm* — Michael J. Striker

(57) ABSTRACT

A self-propelled harvesting machine includes a front harvesting attachment, a ground drive with first and second drive shafts offset relative to the front harvesting attachment, first and second track roller units to which first and second drive shafts are drivably connected and which extend on both sides of the harvesting machine and a rear axle having rear wheels that are steered via a steering mechanism provided in a rear region of the harvesting machine. The first and second drive shafts are driven by separate first and second hydraulic motors of a hydrostatic transmission. A displacement volume of each of the first and second hydraulic motors is changed depending on a steering movement transferred from the steering mechanism to the rear wheels, realizing an additional moment about a vertical axis of the harvesting machine simultaneously with the steering of the rear wheels.

7 Claims, 4 Drawing Sheets

(56) References Cited

U.S. PATENT DOCUMENTS

| | | | | |
|---|---|---|---|---|
| 5,575,716 | A | * | 11/1996 | Jennen .................. B62D 11/20 180/9.44 |
| 9,370,138 | B2 | * | 6/2016 | Bebernes ............. A01B 69/007 |
| 2002/0169536 | A1 | * | 11/2002 | Feucht ................. B62D 11/183 701/50 |
| 2007/0029118 | A1 | * | 2/2007 | Acharya ............. B60K 7/0015 180/53.4 |
| 2009/0152828 | A1 | * | 6/2009 | Bebernes ................. B62D 5/09 280/86 |
| 2010/0307843 | A1 | * | 12/2010 | Lawson, Jr. ......... B60K 17/356 180/6.48 |
| 2013/0333959 | A1 | * | 12/2013 | Wagemann .......... B60K 7/0007 180/62 |

FOREIGN PATENT DOCUMENTS

| | | |
|---|---|---|
| DE | 195 17 571 | 11/1995 |
| DE | 102011114536 | 4/2013 |

* cited by examiner

SELF-PROPELLED HARVESTING MACHINE

CROSS-REFERENCE TO A RELATED APPLICATION

The invention described and claimed hereinbelow is also described in German Patent Application DE 10 2014 105 163.7, filed on Apr. 11, 2014. The German Patent Application, the subject matters of which is incorporated herein by reference, provides the basis for a claim of priority of invention under 35 U.S.C. 119(a)-(d).

BACKGROUND OF THE INVENTION

The invention relates to a self-propelled harvesting machine comprising a front harvesting attachment and two drive shafts of a ground drive that are offset relative to the front harvesting attachment in the longitudinal direction of the harvesting machine. The drive shafts are drivably connected to track roller units that extend on both sides of the harvesting machine and run in the longitudinal direction thereof. A rear axle having rear wheels steered via a steering mechanism is provided in a rear region of the harvesting machine.

Working machines for earthwork usually comprise a ground drive designed as an endless track. The two track assemblies, which are designed as crawler drives, extend on both sides of the longitudinal mid-plane, substantially along the entire length of the chassis of the corresponding working machine. The traction means is designed as a steel chain in this case, wherein contact face elements are mounted on the steel chain by hinges and can be made of plastic or rubber, depending on the application of the working machine. The steel chain is disposed on drive sprockets and is supported in the region of the ground contact area thereof by support rollers. Chain arrangements are provided in which two drive sprockets are designed as deflection wheels and another drive sprocket functions as a drive wheel. In other chain arrangements, only two drive sprockets are provided, where each drive sprocket functions as a drive wheel and as a deflection wheel.

Designs of track assemblies also are known in which the chains provided with contact face elements are replaced by belt-drive track assemblies made of a rubber-metal composite material. In this case as well, the aforementioned support rollers are disposed between the two deflection wheels, which are guided on a frame, wherein the purpose of the support rollers, inter alia, is that of ensuring a more uniform load distribution and better adaptation to different ground contours.

In the past, such track assemblies were used on harvesting machines, in particular, when harvesting machines designed as self-propelled combine harvesters were used to harvest rice. Designing the ground drive as a crawler drive improves the cross-country mobility and the traction behavior of the harvesting machine equipped therewith, wherein the ground pressure also can be significantly reduced due to the larger ground contact area. These track assemblies also are finding increasing use on self-propelled harvesting machines are designed as combine harvesters or forage harvesters in particular, and which accommodate, in the front region thereof, a front attachment that can be raised and lowered.

Without appropriate crawler drives, fields to be harvested usually cannot be driven on after relatively long rainy periods and/or the harvesting machine sinks into the ground so far that the ground condition in the resultant tracks is markedly worsened. These track assemblies therefore also are used on combine harvesters that are used to harvest grain or rapeseed, or they are used on self-propelled forage harvesters for harvesting corn or grass silage so that harvesting can be carried out in a manner that protects the ground to the greatest possible extent, despite the fact that the ground is moist and, possibly, deeply tracked.

On the end thereof facing the front harvesting attachment, these harvesting machines are provided with a driven, non-steerable axle, while an axle on the rear-side end thereof, which is usually not driven, accommodates steerable wheels via spindles. A half-chain arrangement is provided, i.e., one of the drive axles (instead of the drive wheels) is provided with the track roller units, wherein these each typically have a profiled, endless belt band.

Self-propelled harvesting machines are operated on various ground conditions. For example, self-propelled harvesting machines travel on the field during a harvesting process as well as over relatively long stretches of asphalt-covered or paved roads on the approach to the field. An appropriate track roller unit, which is preferably provided with a belt band, has a substantial disadvantage in that, during maneuvering, extreme shear forces occur between the external profiling of the traction means and the ground. When traveling on an asphalt-covered road, the belt band undergoes increased wear during cornering or turning. On the field, the shear forces cause the ground to tear, which is also unwanted, since this alters and damages the ground structure. Some track assemblies are therefore provided with mechanisms for varying the ground contact area and, therefore, for improving the maneuverability of the harvesting machines such that the shear forces are reduced on the field and the turning radius is shortened when turning maneuvers are carried out.

A self-propelled harvesting machine provided with endless track assemblies is known from DE 41 93 720 T1. The endless track assembly described therein is a half-chain drive of a self-propelled combine harvester, in which the rear axle of the harvesting machine has steerable, non-driven wheels. Track assemblies having drive wheels (which are driven by a transmission via two drive shafts) and having deflection rollers and guide rollers are disposed in a first auxiliary frame that is fixedly connected to a main frame of the combine harvester. A second auxiliary frame, which is pivotably guided on the first auxiliary frame, accommodates the rear axle. Depending on a steer angle of the wheels of the rear axle, a so-called weight distribution cylinder is actuated such that, when steering lock occurs, the rear axle is displaced in the direction of the ground via the second auxiliary frame. As a result, a rear section of each of the track assemblies is lifted off the ground.

In addition, DE 10 2011 114 536 A1 discloses a combine harvester, which is equipped with track roller units and, in some of the exemplary embodiments, a rear axle having non-driven, steerable wheels. The track roller units in this case each comprise a belt band, a drive roller, two deflection rollers and support rollers. A ground contact area of each of the belt bands is intended to be reduced during road travel and when changing directions, i.e., when the wheels of the rear axle of the combine harvester are steered. For this purpose, the support rollers are displaced in the direction of the ground such that the deflection rollers lift off the ground and, therefore, the belt band has ground contact only in the region of the support rollers and a section located therebetween.

DE 40 16 496 A1 discloses a hydrostatic ground drive of a tracked vehicle, in which a hydraulic motor having an adjustable displacement volume is assigned to the drive of each of the track chains. The hydraulic motors are acted upon, via pressure medium lines, with different amounts of a pressure medium from one or more hydraulic pumps. In the document it is assumed that, in the case of crawler drives of construction machines, the ground drive is controlled such that the vehicle travels straight ahead when the transmission ratio of the two hydrostatic transmissions is the same and the vehicle travels around a curve when different amount of oil are fed to the hydraulic motors. The latter is intended to take place by means of a suitable adjustment of the delivery rates of the two hydraulic pumps.

SUMMARY OF THE INVENTION

The present invention overcomes the shortcomings of known arts, such as those mentioned above.

The invention improves the steerability of a harvesting machine operated with a front harvesting attachment, without the ground contact areas of the two belt bands assigned to the ground drive being changed during travel around a curve or when the harvesting machine is turned.

In an embodiment, the present invention provides a self-propelled harvesting machine with a front harvesting attachment and two drive shafts of a ground drive that are offset relative to the front harvesting attachment in the longitudinal direction of the harvesting machine. The drive shafts are drivably connected to track roller units that extend on both sides of the harvesting machine and run in the longitudinal direction thereof. A rear axle having rear wheels, which can be steered via a steering mechanism, is provided in a rear region of the harvesting machine.

Each drive shaft is driven by a separate hydraulic motor of a hydrostatic transmission, wherein a displacement volume of each of the two hydraulic motors is changed depending on a steering movement transferred from the steering mechanism to the steerable rear wheels such that a moment about a vertical axis of the harvesting machine is achieved simultaneously with the steering of the rear wheels.

In order to steer a conventional harvesting machine, a moment about the vertical axis thereof is required, wherein, in the known half-crawler arrangements, the moment has been generated exclusively by the pivot movement of the rear of the harvesting machine, which results from the steering procedure of the correspondingly turned so wheels of the rear axle. A moment thereby occurs that counteracts the moment generated about the vertical axis, which is referred to as the turning-resistance moment, due to the long ground contact areas of the crawlers between said crawlers and the ground.

According to the invention, the transmission of the harvesting machine transfers different drive torques to the two track roller units, which are disposed on the right and the left of the harvesting machine. Such arrangement results in generation of an additional moment about the vertical axis to support the travel around the curve. For this purpose, a hydraulic motor of a hydrostatic transmission is assigned to each of the drive shafts, the displacement volume of which is changed depending on the steering movement that is transferred from the steering mechanism to the steerable rear wheels. As a result, a substantial improvement of the turning properties of the harvesting machine is achieved such that the shear forces acting on the ground are markedly reduced. It also is advantageous that the ground contact areas of the track roller units remain unchanged during this turning procedure such that the favorable traction behavior and the low ground pressure is retained in the headland of the field to be harvested. Otherwise considerable ground damage would possibly occur in the region of the headland.

According to DE 41 93 720 T1, the steerability of a self-propelled combine harvester provided with a half-tracked drive also is improved, although, for this purpose, the combine harvester is raised in the rear region thereof in that the steerable wheels assume a greater portion of the load during a steering procedure and, to this end, the track roller unit is raised off the ground in the region of the support rollers and the deflection wheel. As a result, however, the steerable rear wheels and the drive wheel sink into the ground to an extreme extent under the additional load.

The ground contact area of the crawler track belts also is reduced in the arrangement provided according to DE 10 2011 114 536 A1 for improving the steerability of the self-propelled combine harvester provided with the half-tracked drives such that the ground pressure increases on the rest of the ground contact area.

The drive system provided according to DE 40 16 496 A1 is provided for a tracked vehicle having a full-chain drive, i.e., the vehicle does not have any steerable wheels of a corresponding steering axle in addition to the endless track. A piston-displacement actuating device having an arrangement of valves assigned to the individual hydraulic motors is provided so that the two hydraulic motors can always be set on the same control characteristic curve, regardless of which of the chains has the greater tractive resistance. This is intended to improve the straight-ahead running of the tracked vehicle.

In an embodiment of the invention, a hydrostatic transmission is assigned to each of the drive shafts, the working circuit of which is connected to a hydraulic pump having a variable delivery rate. To this end, the working circuits are fed by a common hydraulic pump. As an alternative, each working circuit has a separate hydraulic pump. By use of the separate hydrostatic transmissions, which are assigned to each of the track roller units and comprise correspondingly adjustable hydraulic pumps and adjustable hydraulic motors, the rotational speeds and transferred drive torques of the two track roller units are advantageously regulated independently of one another. These values of the delivery rate and/or displacement volume, which are set on the hydraulic pumps and hydraulic motors by appropriate control devices, are specified by the particular steering movement that is transferred to the non-driven and steerable wheels of the rear axle.

Preferably, the drive of the two track roller units according to the invention is designed such that each of the hydraulic motors drives the drive shaft that is drivably assigned thereto via a mechanical transmission, which is shiftable in at least two transmission ratio steps. The corresponding mechanical transmission has a countershaft design. Within the scope of an appropriate combination of hydrostatic transmission and mechanical transmission, it is provided that at least the mechanical transmissions and, possibly, also the particular hydraulic motors are combined in a common component, which functions as an axle and transmission housing.

The aforementioned at least two shiftable transmission ratio steps of the mechanical transmission are required due to the requirement of a transmission ratio spread between a maximum tractive force and corresponding end speeds. Due to the use of these shift stages, the necessary hydraulic transmission ratio spread is reduced and, therefore, efficiency is improved due to a more efficient hydraulic ground drive. In regard to the high overall transmission ratios required during field operation, hydraulic units having smaller sizes can be used, thereby resulting in weight and cost advantages.

It also is provided in this context that the mechanical transmission comprises a main shaft, which is driven by the hydraulic motor and has drive gears having different numbers of teeth and are rotationally locked on the main shaft and are engaged with intermediate drive gears. The intermediate drive gears, in turn, are disposed on a countershaft in a freely rotatable manner and are selectively coupled thereto via a shifting clutch. A gearwheel, which is disposed on the countershaft in a rotationally locked manner, engages into a driven gear, wherein this driven gear is disposed directly on the drive shaft of the track roller unit. The two thusly designed output shafts accommodate brake disks of a braking device and are preferably connected via universal drive shafts to the crawler drives disposed on the left and on the right of the harvesting machine. Corresponding shifting clutches, which are used for the selective connection of one of the intermediate drive gears to the countershaft, are designed either as simple claw clutches or as claw clutches provided with shift synchronization.

In an embodiment of the invention, a drive wheel of the track roller unit is driven by the drive shaft via an end drive designed as reduction gear. A corresponding reduction gear is designed as a spur-gear drive having an intermediate gear. Moreover, it also is possible to design the step-down transmission as a planetary gear having a stationary transmission ratio.

Finally, it is provided that the rear axle comprises a hydraulic steering system, a measured value receiver for detecting an actual steer angle of the rear wheels is assigned to the steering mechanism and the corresponding steer angles are fed, as actual values, to a regulating mechanism, which delivers setpoint variables to control units of the hydraulic motors. An appropriate master cylinder is provided on the steering mechanism, which delivers setpoint values for the actuation of a steering cylinder, which is designed as a slave cylinder and is provided on the rear axle. The steering movements carried out by the driver on the steering wheel in the driver's cab of the harvesting machine are detected by the aforementioned measured value receivers and are transmitted to the regulating mechanism. The regulating mechanism ensures that the control units of the hydraulic motors are adjusted accordingly depending on the actual steer angle.

Moreover, the regulating mechanism delivers the setpoint variables to shifting actuators of shifting clutches. The regulating mechanism therefore actuate a shift of the shifting clutches.

In this connection, at least two transmission ratio steps are shifted between the particular hydraulic motor and the corresponding drive shaft with each of the shifting clutches.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
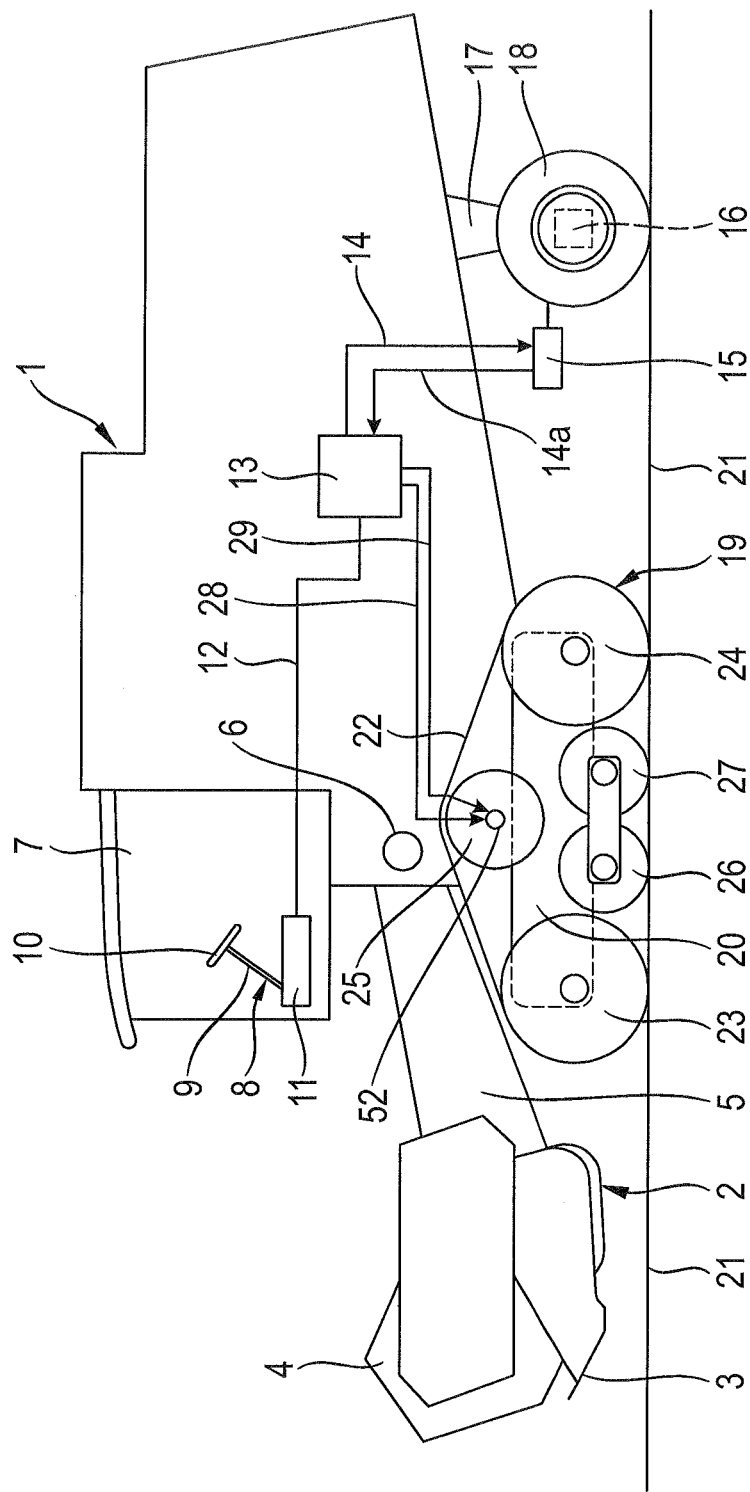
FIG. 1: shows a schematic illustration of a side view of a self-propelled harvesting machine of the invention, designed as a combine harvester, with a corresponding view of one of two track roller units provided on the combine harvester.

FIG. 1 depicts a harvesting machine 1 designed as a self-propelled combine harvester. The harvesting machine 1 comprises, on the front thereof, a front harvesting attachment 2 designed as a grain or rapeseed header. This front harvesting attachment 2 is provided, in the working direction thereof, with a cutter bar 3 and with a reel 4, which can be raised and lowered relative to the front harvesting attachment 2. A feed rake 5 adjoins the front harvesting attachment 2 and is guided via a pivot axis 6 on the combine harvester 1 so as to be raised and lowered. Any type of front harvesting attachment other than a grain and rapeseed header can be used, of course, for example, a front harvesting attachment to harvest corn, grass seed, flax seed, legumes, etc. The self-propelled harvesting machine 1 also can embody a self-propelled forage harvester having replaceable front harvesting attachments, such as a cutting mechanism, a pick-up, a front attachment for harvesting corn, etc.

As is further evident from FIG. 1, the self-propelled harvesting machine 1 is provided with a driver's cab 7 in the region above the feed rake 5, in which a steering mechanism 8, inter alia, is located, the steering mechanism comprising a steering wheel 10, which is disposed on a steering column 9 and a rear wheel position indicator 11. Instead of this rear wheel position indicator 11, a master cylinder also can be a component of the steering mechanism 8. Proceeding from this rear wheel position indicator 11, a first control line 12 extends to a regulating mechanism 13, which processes a setpoint value entered via the steering mechanism 8, i.e., a steering movement of the steering wheel 10, and from which a corresponding setpoint value is transmitted to a steering actuator 15 via a second control line 14. The corresponding actual value is transmitted from the steering actuator 15 to the regulating mechanism 13 via a control line 14a.

As shown in FIG. 1, the steering actuator 15 is disposed on a rear axle 16, on which a chassis 17 of the self-propelled harvesting machine 1 is supported. Steerable rear wheels are disposed on this rear axle 16, of which only one rear wheel 18 can be seen in the side view of FIG. 1. The corresponding pivoting of the two rear wheels on the rear axle 16 will be described in the following in conjunction with FIG. 2.

The self-propelled harvesting machine 1 also comprises a track roller unit 19, which substantially supports the weight of the self-propelled harvesting machine 1 on a ground 21 of a field to be harvested via another chassis part 20. The track roller unit 19 comprises an endless track belt 22, which is profiled on the outer circumference thereof. This track belt 22 wraps around two deflection wheels 23 and 24 as well as a drive wheel 25. The track belt 22, extending away from the chassis part 20, is pressed against the ground 21 by support rollers 26 and 27 in a region located between the two deflection wheels 23 and 24. As is also evident from the illustration, the regulating mechanism 13 acts via sensor lines 28 and 29 on the drive of the drive wheel 25. These drive elements also are provided in a mirror-image arrangement on the other side of the self-propelled harvesting machine 1, i.e., on the right side as viewed in the direction of travel.

Figure 2:
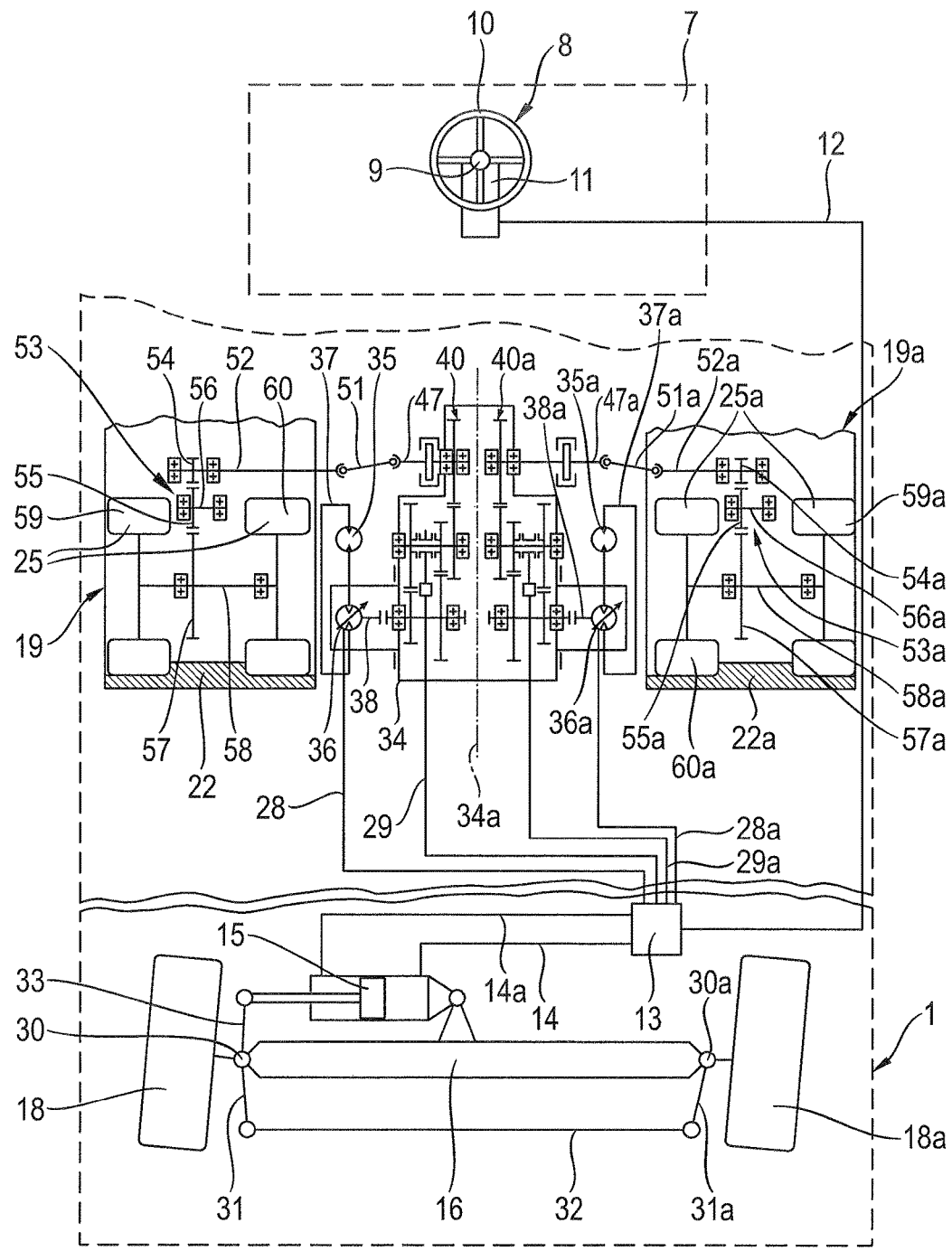
FIG. 2 shows a schematic illustration of one embodiment of a steering and drive system of the self-propelled harvesting machine shown in FIG. 1, in a top view.

The arrangement of the corresponding track roller units 19 and 19a as well as the drive thereof according to the invention can be seen, in particular, in an exemplary embodiment illustrated in FIG. 2, which follows. The same reference numerals are used in the following for any components that were already explained in conjunction with FIG. 1. The steering of the rear wheels 18 and 18a provided on the rear axle 16 shall be discussed first. The rear wheels 18 and 18a are pivotably guided on the rear axle 16 via spindles 30 and 30a, wherein the spindles 30 and 30a are coupled to one another via tie rod levers 31 and 31a and a tie rod 32. In addition, a steering lever 33 extends away from the spindle 30 and is connected to the steering actuator 15, which is designed as a slave cylinder.

As previously explained with reference to FIG. 1, the regulating mechanism 13 is connected to the steering actuator via two second control lines 14 and 14a, which are designed as pressure medium lines, wherein a hydraulic steering valve can be assigned to the regulating mechanism 13 in the present case. By these two control lines 14 and 14a, pressure is selectively applied to one of the two pressure chambers of the slave cylinder, i.e., the steering actuator 15 is displaced accordingly. A change in the steer angle at the rear axle 16 is triggered via the steering wheel 10 disposed in the driver's cab 7, as is customary. This changed steer angle is transferred by the rear wheel position indicator 11, which is connected to the steering column 9 of the steering mechanism 8, to the regulating mechanism 13 via the first control line 12.

As explained above, sensor lines, which are labeled with reference numerals 28, 28a and 29, 29a within the scope of the two drive units, extend away from the regulating mechanism 13 and lead to the drive of the two track roller units 19 and 19a. Separate drive units for the left track roller unit 19, as viewed in the direction of travel, and for the right track roller unit 19a, as viewed in the direction of travel, are provided inside an axle or transmission housing 34. A mirror-image design therefore results for both drive units on both sides of an axis of symmetry 34a. This is explained in greater detail in the following with reference to both drive units.

Two hydraulic pumps 35, 35a, which are driven by a non-illustrated internal combustion engine and which are designed as variable-displacement pumps, supply pressure medium to two hydraulic motors 36, 36a. The two hydraulic motors 36, 36a have a variable displacement volume and are disposed in hydrostatic working circuits 37, 37a. Both the respective hydraulic pump 35, 35a and the corresponding hydraulic motor 36, 36a are designed as a unit provided with a non-illustrated swash plate, i.e., as a displaceable axial piston pump and as a displaceable axial piston motor, respectively. An output shaft 38 and 38a extends away from each of the hydraulic motors 36 and 36a, respectively.

Figure 3:
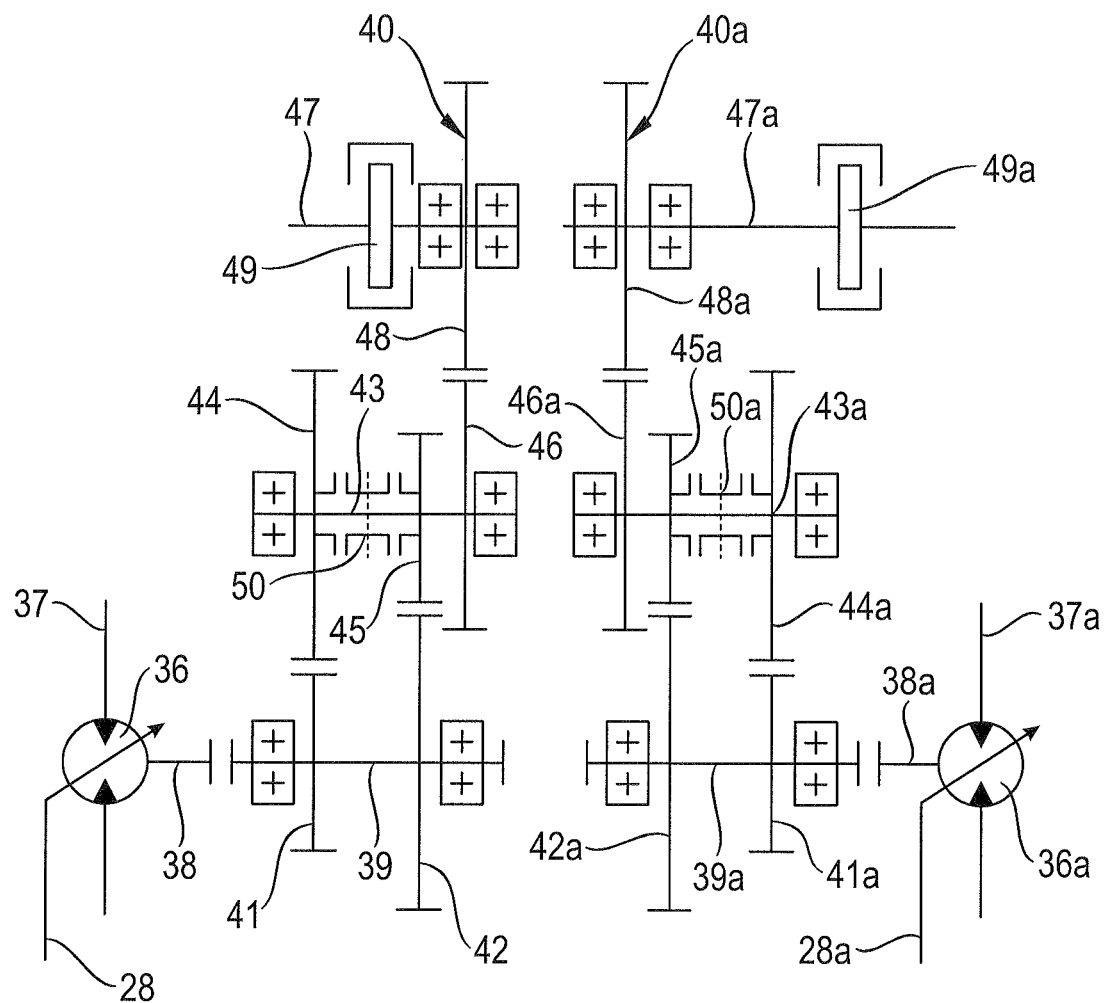
FIG. 3 shows a schematic illustration of another embodiment of a steering and drive system of the self-propelled harvesting machine shown in FIG. 1, in a top view.

The design of two mechanical transmissions disposed in a common axle or transmission housing 34 is initially explained with reference to FIG. 3. According thereto, the hydraulic motors 36 and 36a are each coupled in a rotationally locked manner to a main shaft 39, 39a of a mechanical transmission 40, 40a. Drive wheels 41, 41a and 42, 42a are disposed in a rotationally locked manner on this main shaft 39, 39a and are engaged with intermediate drive gears 44, 44a and 45, 45a disposed on a countershaft 43, 43a in a freely rotatable manner. A shifting clutch 50, 50a is disposed between the two intermediate drive gears 44 and 45, each of which couples one of the intermediate drive gears 44, 44a or 45, 45a to the countershaft 43, 43a. This enables the mechanical transmission 40 to be shifted into two different transmission ratio steps. An output from the countershaft 43, 43a takes place via a gearwheel 46, 46a, which is disposed on said countershaft in a rotationally locked manner and meshes with an output gear 48, 48a, which is disposed on an output shaft 47, 47a. The output shaft 47, 47a accommodates a brake disk 49, 49a of a braking mechanism.

FIG. 2 shows that a universal drive shaft 51, 51a is connected to the output shaft 47, 47a and, at the other end thereof, is connected in an articulated manner to a drive shaft 52, 52a. Furthermore, it is evident that the track roller unit 19 comprises an end drive 53, 53a, which functions as a reduction gear and is formed of the drive shaft 52, 52a, which is provided with a gearwheel 54, 54a, an intermediate shaft 56, 56a, which is provided with a gearwheel 55, 55a, and a pinion shaft 58, 58a, which is provided with a gearwheel 57, 57a. The pinion shaft 58, 58a is connected at the ends thereof to pinions 59, 59a and 60, 60a, which engage in a form-fit manner on an inner circumference of the endless track belt 22, 22a and therefore form the drive gear 25 and 25a mentioned in conjunction with FIG. 1.

As a result, not only is the steering lock implemented at the rear axle 16, but the displacement volumes of the two hydraulic motors 36 and 36a are adjusted such that different drive torques are transferred to the track roller units 19 and 19a and a moment is generated about a vertical axis of the self-propelled harvesting machine 1 that results in a reduction of the turning resistance moment. Due to the use of two mechanical transmissions 40 and 40a, each of which is assigned to the track roller units 19 and 19a, respectively, a necessary hydraulic spread can be reduced.

Figure 4:
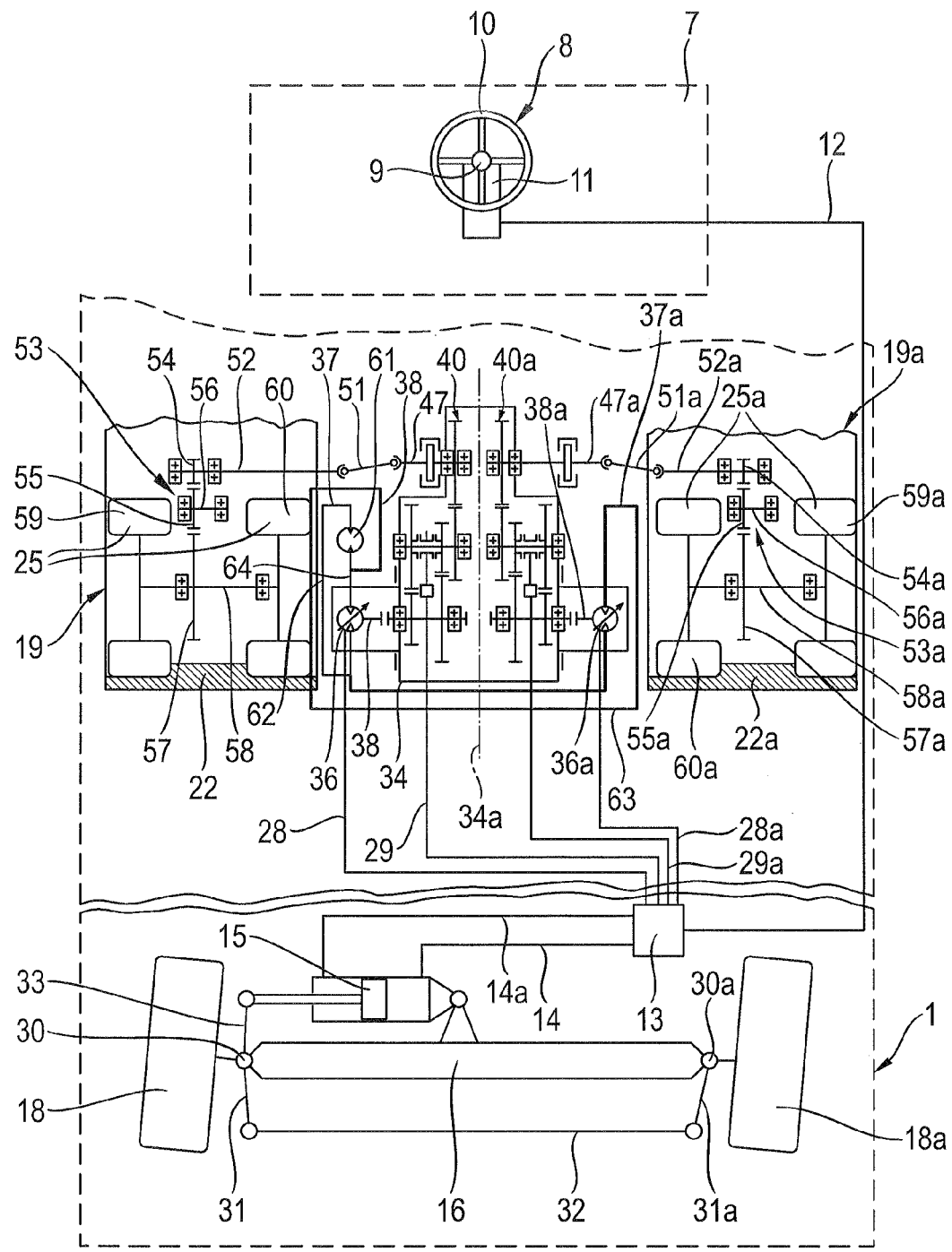
FIG. 4 shows a larger-scale view of a mechanical transmission depicted in FIG. 2.

The illustration in FIG. 4 shows another exemplary embodiment of the steering and drive system. The same reference numerals are used in the following for any components that were already explained in conjunction with FIG. 2. The steering and drive system according to the exemplary embodiment depicted in FIG. 4 differs from the exemplary embodiment depicted in FIG. 2 only in that exactly one hydraulic pump 61 is provided, which supplies pressure medium to both hydraulic motors 36, 36a. The hydraulic pump 61 supplies the hydraulic motor 36 in the hydrostatic working circuit 37 and the hydraulic motor 36a in the hydrostatic working circuit 37a via a supply line 62. The pressure medium is returned to the hydraulic pump 61 via a return line 63 and 64.

LIST OF REFERENCE CHARACTERS 1 self-propelled harvesting machine
2 front harvesting attachment
3 cutter bar
4 reel
5 feed rake
6 pivot axis
7 driver's cab
8 steering mechanism
9 steering column
10 steering wheel 11 rear wheel position indicator
12 first control line
13 regulating mechanism
14 second control line
14a second control line
15 steering actuator
16 rear axle
17 chassis part
18 rear wheel
18a rear wheel
19 track roller unit
19a track roller unit
20 chassis part
21 ground
22 track belt
22a track belt
23 deflection wheel
24 deflection wheel
25 drive wheel
25a drive wheel
26 support roller
27 support roller
28 sensor line
28a sensor line
29 sensor line
29a sensor line
30 spindle
31 tie rod lever
32 tie rod
33 steering lever
34 axle and transmission housing
34a axis of symmetry
35 hydraulic pump
35a hydraulic pump
36 hydraulic motor
36a hydraulic motor
37 hydrostatic working circuit
37a hydrostatic working circuit
38 output shaft
38a output shaft
39 main shaft
39a main shaft
40 mechanical transmission
40a mechanical transmission
41 drive wheel
41a drive wheel
42 drive wheel
42a drive wheel
43 countershaft
43a countershaft
44 intermediate drive gear
44a intermediate drive gear
45 intermediate drive gear
45a intermediate drive gear
46 gearwheel of 43
46a gearwheel of 43a
47 output shaft
47a output shaft
48 output gear
48a output gear
49 brake disk
49a brake disc
50 shifting clutch
50a shifting clutch
51 universal drive shaft
51a universal drive shaft
52 drive shaft
52a drive shaft
53 end drive
53a end drive
54 gearwheel of 52
54a gearwheel of 52a
55 gearwheel of 56
55a gearwheel of 56a
56 intermediate shaft
56a intermediate shaft
57 gearwheel of 58
57a gearwheel of 58a
58 pinion shaft
58a pinion shaft
59 pinion
59a pinion
60 pinion
60a pinion
61 hydraulic pump
62 supply line
63 return line
64 return line As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A self-propelled harvesting machine comprising:
a front harvesting attachment;
a ground drive with first and second drive shafts offset relative to the front harvesting attachment in the longitudinal direction of the harvesting machine;
first and second track roller units to which the first and second drive shafts are drivably connected respectively, wherein the first and second track roller units extend on both sides of the harvesting machine and run in the longitudinal direction thereof;
a hydrostatic transmission comprising first and second hydraulic motors and first and second mechanical transmissions; and
a rear axle having rear wheels that are steered via a steering mechanism provided in a rear region of the harvesting machine;
wherein each of the first and second drive shafts is driven separately by the respective first and second hydraulic motors of the hydrostatic transmission, respectively;
wherein a displacement volume of each of the first and second hydraulic motors is changed depending on a steering movement transferred from the steering mechanism to the rear wheels such that an additional moment about a vertical axis of the harvesting machine is achieved simultaneously with the steering of the rear wheels; and
wherein the first and second hydraulic motors drive the first and second drive shafts, respectively, via the first and second mechanical transmissions, which first and second mechanical transmissions are shiftable in at least two transmission ratio steps.

2. The self-propelled harvesting machine according to claim 1, wherein the hydrostatic transmission is assigned to the first and second drive shafts and to first and second working circuits connected to first and second hydraulic pumps and wherein the first and second hydraulic pumps are characterized by a variable delivery rate.

3. The self-propelled harvesting machine according to claim 1, wherein each of the first and second mechanical transmissions embodies a countershaft design.

4. The self-propelled harvesting machine according to claim 3, wherein each of the first and second mechanical transmissions comprises a main shaft driven by the respective first and second hydraulic motors and drive gears having different numbers of teeth, the drive gears disposed on the main shaft in a rotationally locked manner such that the teeth engage with intermediate drive gears that are freely rotatable on a countershaft and selectively coupled to the countershaft via a shifting clutch and, a gearwheel disposed on the countershaft in a rotationally locked manner that is engaged with a driven gear, wherein the driven gear is at least indirectly connected to one of the first and second drive shafts.

5. The self-propelled harvesting machine according to claim 4, wherein one of the drive gears of the first and second track roller units is driven by one of the respective first and second drive shafts via one of first and second end drives designed as reduction gears.

6. The self-propelled harvesting machine according to claim 5, wherein the first and second end drives are designed as spur-gear drives having respective intermediate gears.

7. The self-propelled harvesting machine according to claim 5, wherein the first and second end drives are designed as planetary gears having a stationary transmission ratio.

\* \* \* \* \*